United States Patent [19]

Hiss

[11] Patent Number: 4,469,743
[45] Date of Patent: Sep. 4, 1984

[54] POLYVINYL BUTYRAL LAMINATES

[75] Inventor: Timothy G. Hiss, Vienna, W. Va.

[73] Assignee: E. I. Du Pont De Nemours and Company, Wilmington, Del.

[21] Appl. No.: 475,078

[22] Filed: Mar. 14, 1983

[51] Int. Cl.$^3$ .................. B32B 17/10; B32B 27/08
[52] U.S. Cl. .................................. 428/215; 156/106;
156/329; 428/437; 428/448; 428/451; 428/483
[58] Field of Search ............... 156/106, 329; 428/215, 428/437, 448, 451, 483

[56] References Cited

U.S. PATENT DOCUMENTS

| | | | |
|---|---|---|---|
| 2,400,957 | 5/1946 | Stamatoff | 260/73 |
| 2,632,921 | 3/1953 | Kreidl | 18/47.5 |
| 2,648,097 | 8/1953 | Kritchever | 18/47.5 |
| 2,683,894 | 7/1954 | Kritchever | 18/1 |
| 2,704,382 | 3/1955 | Kreidl | 18/47.5 |
| 2,720,501 | 10/1955 | Van Ness | 260/73 |
| 2,739,080 | 3/1956 | Woodworth | 117/38 |
| 3,431,135 | 3/1969 | Keane | 117/46 |
| 3,706,592 | 12/1972 | Thomson | 117/72 |
| 3,900,673 | 8/1975 | Mottimoe et al. | 428/339 |
| 3,986,997 | 10/1976 | Clark | 260/29.2 |
| 4,059,469 | 11/1977 | Mattimoe | 156/108 |
| 4,072,779 | 2/1978 | Knox et al. | 428/220 |
| 4,168,332 | 9/1979 | Leinen et al. | 427/160 |
| 4,177,315 | 12/1979 | Ubersax | 428/336 |
| 4,242,403 | 12/1980 | Mattimoe et al. | 428/213 |
| 4,310,600 | 1/1982 | Cross | 428/447 |

OTHER PUBLICATIONS

Hercules ® Azide Chemicals–Bulletin OPD–26.

*Primary Examiner*—James C. Cannon

[57] ABSTRACT

Polyvinyl butyral laminates with polyethylene terephthalate having an abrasion-resistant silanol coating and their preparation.

27 Claims, No Drawings

POLYVINYL BUTYRAL LAMINATES

BACKGROUND OF THE INVENTION

Polyvinyl butyral is widely used in combination with one or more layers of glass or other glazing material to provide a laminate which is resistant to shattering. In recent years, effort has been directed to the preparation of other composites which can be used in combination with glass to provide not only resistance to shattering but protection against abrasion and scratching when used as a component of a glazing material.

The preparation of laminates for use in automotive windshields presents unusually stringent requirements. In addition to the basic requirements noted above, an automotive windshield must provide high impact resistance and excellent optical clarity. Beyond this, for improved fuel efficiency, these characteristics should desirably be provided at a minimum weight. Previously, attempts to provide this combination of properties have often resulted in a laminate that performed well at ambient conditions, but crazed when exposed to especially high or low temperatures or humidity.

SUMMARY OF THE INVENTION

The present invention provides an improved process for the production of polymeric laminates useful in conjunction with glazing material, as well as the resulting products, which are characterized by outstanding abrasion resistance, clarity and adhesion to glazing material.

Specifically, the instant invention provides a process for preparing a polymeric laminate comprising:

(a) coating at least one surface of a biaxially oriented, dimensionally stable, polyethylene terephthalate film having a thickness of about 2-7 mils and a haze level of less than about 1.0%, to provide a dry thickness of about 1-20 microns with an organic silanol coating composition comprising:
  (i) about 5-50 weight percent solids, the solids being partially polymerized and complementally comprising about 10-69 weight percent silica; about 0.01-4 weight percent of azido functional silanol; up to 20 weight percent of epoxy functional silanol; and about 30-89 weight percent of organic silanol of the general formula $RSi(OH)_3$, wherein R is selected from methyl and up to 40% of a radical selected from vinyl and phenyl, and
  (ii) about 95-50 weight percent solvent, the solvent comprising about 10-90 weight percent water and about 90-10 weight percent lower aliphatic alcohol and containing about 0.01-1.0% non-ionic surfactant; the coating composition having a pH of about 6.2-6.5; and
(b) bonding the polyethylene terephthalate film at elevated heat and pressure to a sheet of plasticized polyvinyl butyral to provide a laminate in which the surface of the polyethylene terephthalate not bonded to the polyvinyl butyral is coated with the organic silanol composition.

The instant invention further provides a polymeric laminate comprising, (a) a sheet of plasticized polyvinyl butyral;
(b) a biaxially oriented, dimensionally stable, polyethylene terephthalate film bonded to the polyvinyl butyral and having a thickness of about 2-7 mils and a haze level of less than about 1.0%; and
(c) a coating on the polyethylene terephthalate film having a thickness of about 1-20 microns, the coating having been produced from an organic silanol composition comprising:
  (i) about 5-50 weight percent solids, the solids being partially polymerized and complementally comprising about 10-69 weight percent silica; about 0.01-4 weight percent of azido functional silanol; up to 20 weight percent of epoxy functional silanol; and about 30-89 weight percent of organic silanol of the general formula $RSi(OH)_3$, wherein R is selected from methyl and up to 40% of a radical selected from vinyl and phenyl, and
  (ii) about 95-50 weight percent solvent, the solvent comprising about 10-90 weight percent water and about 90-10 weight percent lower aliphatic alcohol and containing about 0.01-1.0% non-ionic surfactant;
the coating composition having a pH of about 6.2-6.5; and in which at least the surface of the polyethylene terephthalate film not bonded to the polyvinyl butyral bears a coating (c).

Preferably, the polyethylene terephthalate film is treated on at least one side to enhance the ability of the film to adhere to other materials.

DETAILED DESCRIPTION OF THE INVENTION

The present invention is based on the discovery that in the preparation of a laminate of polyvinyl butyral and polyethylene terephthalate having an abrasion resistant coating, the selection of specific components and process variables will result in a laminate particularly suitable for use with glazing materials which exhibits outstanding optical properties, integrity, resistance to crazing at extreme temperatures and humidity, abrasion resistance and adhesion to glazing materials. In addition, the laminates provide glazing materials with markedly improved penetration resistance.

The polyethylene terephthalate sheeting used in the present invention is biaxially oriented by stretching at least about 2.5 times in each of the longitudinal and transverse directions in the plane of the film. An important feature of the polyethylene terephthalate films used in the present invention is that they exhibit a haze level of less than about 1.0%, as measured according to ANSI/ASTM D 1003-61, using the hazemeter specified in that test. This haze level is attained by the absence of filler and uniform surface characteristics resulting from the processing conditions described in Alles, U.S. Pat. No. 2,779,684, hereby incorporated by reference. In addition, the film is dimensionally stabilized, for example, by heating under tension as described in the Alles patent. This dimensional stabilization should be carried out at a temperature at least equal to the temperature of intended use.

One or both surfaces of the polyethylene terephthalate film may be conditioned to enhance their ability to adhere to other materials. However, it has been found that the coating compositions used in the present invention provide excellent adhesion to the polyethylene terephthalate film without the need for flame treatment. However, it is often desirable to treat the surface of the polyethylene terephthalate film on the side which is to be bonded to the polyvinyl butyral for improved adhesion. For example, the surface of the film to be bonded with the polyinyl butyral can be coated with an adhesion-promoting material, such as the water-permeable colloid substratum described in the Alles patent to which reference is made above. In the alternative, one or both surfaces can be conditioned by direct contact with a gas flame for a period of time sufficient to alter the surface characteristics of the treated material, but not for so long a period as to change the bulk properties of the film. Flame treating techniques previously known which can be used in the present invention include those described in Kreidl U.S. Pat. No. 2,632,921, Kritchever U.S. Pat. No. 2,648,097, Kritchever U.S. Pat. No. 2,683,894 and Kreidl U.S. Pat. No. 2,704,382, all of which are hereby incorporated by reference. Preferably a reducing flame having a high fuel to oxygen ratio is used.

Other electrical and chemical surface conditioning treatments known to improve adhesion of polymeric films can also be used in the instant invention.

The polyethylene terephthalate film is coated on at least one side with an abrasion resistant coating of the composition indicated above. The coating is generally present in a final coating thickness of about 1-20 microns. The silica and organic silanol components and the general preparation of these coating compositions are described in detail in Ubersax U.S. Pat. No. 4,177,315, hereby incorporated by reference. However, in addition to the silica and organic silanol described in that patent, the present coating composition further comprises, as about 0.01-4 percent of the solids in the coating composition, at least one azido-functional silanol. The silanols are obtained from the silane compounds of the general formula:

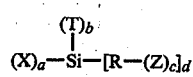

wherein R is an organic radical, X is selected from halo, hydroxy, alkoxy, aryloxy, organo oxycarbonyl, azido, amine, and amide radicals; T is selected from alkyl, cycloalkyl, aryl, alkaryl, and aralkyl radicals; a is an integer from 1 to 3; b is an integer from 0 to 2; c is an integer from 1 to 10; d is an integer from 1 to 3; and a+b+d equals 4; and Z is selected from

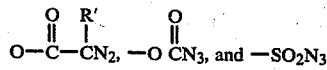

where R' is selected from hydrogen, alkyl, cycloalkyl, aryl and —COOR" radicals; where R" is selected from alkyl, cycloalkyl, and aryl radicals. These silanes can be prepared as described in Thompson U.S. Pat. No. 3,706,592, hereby incorporated by reference. The silanols are obtained by the addition of the silanes to the aqueous components of the coating composition.

Preferably, the silanes used to obtain the silanols in the coating composition are di- or trialkoxy silanes, that is, compounds of the above formula in which X is alkoxy of 1-3 carbon atoms and a is 1 or 3.

Also preferred are those silanes in which Z is sulfonyl azide, that is, —SO$_2$N$_3$.

The R groups in the silane compounds can vary widely, but will generally contain from 6-28 carbon atoms. In addition, the R group will generally be aromatic, and those silane compounds in which R is an alkylene arylene have been found to be particularly satisfactory.

The coating solution, in accordance with the present invention, also contains about 0.01-1.0%, by weight of the solvent, of a non-ionic surfactant. A wide variety of such surfactants is commercially available, including, for example, fluoro-surfactants available from E. I. du Pont de Nemours and Company as Zonyl non-ionic fluoro-surfactants, and from 3M as Fluorad non-ionic fluoro-surfactants. Particularly preferred because of compatibility with the other components of the coating solution are silicone surfactants. Such silicone surfactants include, for example, polyalkylene oxide methylpolysiloxanes, such as those commercially available from Union Carbide as Silwet surface active copolymers and those commercially available from Dow Corning Corporation as silicone glycol copolymer fluids. One such silicone surfactant found to be particularly useful is the polyethyleneoxide methyl siloxane commercially available from Union Carbide Corporation as Silwet L-720.

The coated polyethylene terephthalate film is next laminated, under typical conditions of elevated temperature and pressure, to a plasticized polyvinyl butyral sheet. The lamination is carried out to provide a polyethylene terephthalate film surface coated with the abrasion resistant coating opposite to the surface of the film bonded to the polyvinyl butyral. The preparation of such polyvinyl butyral sheeting is described, for example, in VanNess U.S. Pat. No. 2,720,501, Stamatoff U.S. Pat. No. 2,400,957, and Woodworth U.S. Pat. No. 2,739,080, all hereby incorporated by reference. The polyvinyl butyral can contain a wide variety of plasticizers, as known in the art, including, for example, triethylene glycol di-2-ethylbutyrate, dihexyl adipate, triethylene glycol di-n-heptanoate, tetraethylene glycol di-n-heptanoate, propylene oxide oligomers and mixtures of these and other plasticizers. Particularly satisfactory polyvinyl butyral sheeting is that commerically available as Butacite plasticized polyvinyl butyral resin sheeting from E. I. du Pont de Nemours and Company.

The polyvinyl butyral used in the present invention should exhibit a satisfactorily high level of adhesion to glazing materials. This level of adhesion is attained by minimizing the adhesion control additives, for example, used in the polyvinyl butyral sheeting. A maximum of about 400 parts per million of potassium based adhesion control additives can be used in polyvinyl butyral plasticized with tetraethylene glycol di-n-heptanoate. The level of adhesion control additives should be such as to provide a peel force between the polyvinyl butyral sheeting and the polyester film or glass of at least about 5 pounds per inch.

The polyvinyl butyral surface of the present laminates can be bonded to glass using elevated heat and pressure in conventional laminating techniques. The present laminates caan be bonded to either a single layer of glass or a glass laminate, such as a conventional three-layer glass sandwich comprising two layers of glass and an intermediate layer of polyvinyl butyral sheeting. In either case, the components are typically assembled in the desired order, heated to a temperature of 35°–110° C., and then either rolled or otherwise pressurized or placed in a vacuum chamber to remove air trapped between the layers. The edges of the laminate are then typically sealed to prevent the reentry of air between the layers and the assembly then placed in an autoclave to effect the final bonding of the layers. Typically, the autoclave is operated at a temperature of about 100°-160° C. with an applied pressure of about 150-300 psi. The lamination is generally complete at about 5-120 minutes.

In the preparation of the laminates of the present invention in which a polymeric laminate of polyvinyl butyral, polyethylene terephtalate and coating is laminated to glass, an additional glass sheet is conveniently placed on top of the coating during the laminating operation. To permit the easy removal of this glass sheet after the lamination operation, a release agent or non-stick film can be provided between the coating surface and the glass sheet. In the alternative, a slip agent can be applied to the coated polyethylene terephthalate, so long as the release agent does not contain particles of sufficient size to adversely affect the optical characteristics of the finished product.

The resulting glass structure exhibits excellent optical characteristics, abrasion resistance, and penetration resistance. In addition, the polymeric laminates, alone or in combination with glass, show exceptional resistance to crazing at extremely high and low temperatures and high humidity. As noted previously, the coating compositions used in the present invention provide excellent adhesion without the need of flame treatment or other surface modification.

The invention is further illustrated in the following examples, in which parts and percentages are by weight unless otherwise indicated.

EXAMPLES 1-7 AND COMPARATIVE EXAMPLES A-C

In Examples 1-3, 468 parts of a 30 percent aqueous solution of colloidal silica were added to a reaction vessel. The pH of the solution was adjusted to 5.0 by the addition of glacial acetic acid. 342 parts of methyltrimethoxysilane and 23 parts of a 41 percent methylene chloride solution of Hercules Coupling Agent S3076 trimethoxy silane alkyl-aryl sulfonyl azide were added, and the solution was mixed for 6 hours at room temperature. 1062 parts of a 2/1 isopropanol/water mixture was then added along with 0.4 parts of a silicone surfactant. The pH of the resulting solution was adjusted to 6.2 by the addition of glacial acetic acid.

A 4-mil biaxially oriented polyethylene terephthalate film was then coated on both sides with the silanol solution. Excess solution was allowed to drain from the polyethylene terephthalate film, which was then placed in an oven with a circulating air flow maintained at about 150° C. for 30 minutes in Example 1, at about 150° C. for 6 hours in Example 2, and at about 120° C. for 36 hours in Example 3. The times used in Examples 2 and 3 corresponded to reaction times for the azido silane as published by the manufacturer. The dried thickness of the coating was about 4 microns in each case.

In Example 4, the procedure of Example 1 was repeated, except that 5 parts of S3076 silane sulfonyl azide solution was used instead of 23 parts.

In Example 5, the procedure of Example 2 was repeated, except that 1 part of S3076 silane sulfonyl azide solution was used instead of 23 parts.

In Example 6, the procedure of Example 1 was repeated, except that the 4-mil biaxially oriented polyethylene terephthalate film was flame treated by contact with a reducing flame to improve adhesion characteristics prior to being coated with the silanol solution.

In Example 7, the procedure of Example 1 was repeated, except that the 23 parts of S3076 silane sulfonyl azide was replaced with 12 parts of S3076 silane sulfonyl azide solution and 19 parts of gamma glycidoxypropyl trimethoxy silane (A-187 from Union Carbide Corporation).

In Comparative Examples A and B, the procedure of Examples 1 and 2 was repeated, except that the 23 parts of S3076 silane sulfonyl azide solution was replaced with 37 parts of gamma glycidoxypropyl trimethoxy silane (A-187 from Union Carbide Corporation). In addition, the 4-mil biaxially oriented polyethylene terephthalate film was flame treated by contact with a reducing flame to improve adhesion characteristics prior to being coated with the silanol solution.

In Comparative Example C, the procedure of Comparative Example B was repeated except that the 4-mil biaxially oriented polyethyene terephthalate film was not flame treated.

The coated films of Examples 1-7 and Comparative Examples A-C were tested for adhesion of the coating to the polyethylene terephthalate film as-produced and after periods of about 7 days and about 14 days in a chamber maintained at about 53° C. and at about 100 percent relative humidity. The coating adhesion was determined by the tape adhesion parallel cut method (ASTM D 3002-71). A pressure-sensitive tape was applied to 3×3 pattern of 9 squares of about ⅛-inch sides scribed through the coating on the polyethylene terephthalate film. The tape was then quickly removed and the fraction of film surface within the squares still covered by the coating was estimated. The coating applied according to the present invention was clearly superior to the Comparative Examples in adhesion and adhesion retention. The results are summarized in Table I.

TABLE I

| | | ADHESION OF COATING TO POLYETHYLENE TEREPHTHALATE FILM | | |
|---|---|---|---|---|
| | | TAPE PEEL TEST Coating Remaining on Substrate (%) | | |
| Example | Description | As-Produced | After 7 days 53° C./100% RH | After 14 days 53° C./100% RH |
| 1 | Untreated PET; 1.9% azido-silane added; 30-minute cure at 150° C. | 100 | 100 | 89 |
| 2 | Untreated PET; 1.9% azido-silane added; 6-hour cure at 150° C. | 100 | 100 | 100 |
| 3 | Untreated PET; 1.9% azido-silane added 36-hour cure at 120° C. | 100 | 100 | 97 |
| 4 | Untreated PET; | 100 | 100 | 98 |

TABLE I-continued
ADHESION OF COATING TO POLYETHYLENE TEREPHTHALATE FILM

| | | TAPE PEEL TEST Coating Remaining on Substrate (%) | | |
|---|---|---|---|---|
| Example | Description | As-Produced | After 7 days 53° C./100% RH | After 14 days 53° C./100% RH |
| 5 | Untreated PET; 0.4% azido-silane added; 30-minute cure at 150° C. | 100 | 100 | 61 |
| 6 | Flame-treated PET; 0.08% azido-silane added; 6-hour cure at 150° C. | 100 | 100 | 67 |
| 7 | Untreated PET; 1.9% azido-silane added; 30-minute cure at 150° C. | 83 | 56 | 25 |
| 8 | Flame-treated PET; 0.9% azido-silane and 3.7% epoxy-silane added; 30-minute cure at 150° C. | 100 | 50 | 56 |
| A | Flame-treated PET; 7% epoxy-silane added; 30-minute cure at 150° C. | 100 | 100 | 67 |
| B | Flame-treated PET; 7% epoxy-silane added; 6-hour cure at 150° C. | 80 | 0 | 0 |
| C | Untreated PET; 7% epoxy-silane added; 6-hour cure at 150° C. | | | |

EXAMPLES 1–8 AND COMPARATIVE EXAMPLES A–D

Abrasion Resistance

In Example 8, the procedure of Example 7 was repeated, except that the polyethylene terephthalate film was flame treated on the surface to be coated as in Example 6.

In Comparative Example D, the procedure of Example 6 was repeated except that the biaxially oriented, flame-treated, heat-relaxed polyethylene terephthalate film was not coated with any solution.

The coated films of Examples 1–8 and Comparative Examples A–D were compared for abrasion resistance on the coated surface. The abrasion resistance was determined by the method described in ANSI Z 26.1-1977 Section 5.17. An integrating sphere, photoelectric photometer (ASTM D 1003-61-1977) was used to measure the light scattered by the samples before and after being exposed to 100 revolutions of an abrasive wheel carrying a load of 500 grams (Taber Abraser, ASTM D 1044-76). The Examples of this invention were at least as abrasion resistant as those of the Comparative Examples. The results are summarized in the following Table II.

TABLE II
ABRASION RESISTANCE

| Example | Description | TABER ABRASER TEST Change in Percent Haze After 100 Cycles |
|---|---|---|
| 1 | Untreated PET; 1.9% azido-silane added; 30-minute cure at 150° C. | 4.0 |
| 2 | Untreated PET; 1.9% azido-silane added; 6-hour cure at 150° C. | 2.0 |
| 3 | Untreated PET; 1.9% azido-silane added; 36-hour cure at 120° C. | 3.1 |
| 4 | Untreated PET; 0.4% azido-silane added; 30-minute cure at 150° C. | 1.2 |
| 5 | Untreated PET; 0.08% azido-silane added; 6-hour cure at 150° C. | 1.2 |
| 6 | Flame-treated PET; 1.9% azido-silane added; 30-minute cure at 150° C. | 2.9 |
| 7 | Untreated PET; 0.9% azido-silane and 3.7% epoxy-silane added; 30-minute cure at 150° C. | 5.4 |
| 8 | Flame treated PET; 0.9% azido-silane and 3.7% epoxy-silane added; 30-minute cure at 150° C. | 1.4 |
| A | Flame-treated PET; 7% epoxy-silane added; 30-minute cure at 150° C. | 1.6 |
| B | Flame-treated PET; 7% epoxy-silane added; 6-hour cure at 150° C. | 1.4 |
| C | Untreated PET; 7% epoxy-silane added; 6-hour cure at 150° C. | 2.2 |

TABLE II-continued
ABRASION RESISTANCE

| Example | Description | TABER ABRASER TEST Change in Percent Haze After 100 Cycles |
|---|---|---|
| D | Flame-treated PET; No coating | 34 |

EXAMPLES 9 AND 10 COMPARATIVE EXAMPLES E AND F

Craze Resistance of the Coated Layer on the Polyethylene Terephthalate Film

In Example 9, the procedure of Example 3 was repeated, except that the polyethylene terephthalate film was heated to a temperature of about 120° C. while under tension. The coated film was laminated to polyvinyl butyral sheeting having a hydroxyl content of about 23%, a potassium-based adhesion control additive content of about 250 ppm, a thickness of about 30 mils, and plasticized with about 28% of tetraethyleneglycol di-n-heptanoate and further laminated to a sheet of 3/32-inch nominal thickness glass. The components were laminated at a pressure of 225 pounds per square inch and a temperature of about 120° C. for a period of 9 minutes to provide a unitary structure with excellent clarity.

In Example 10, the procedure of Example 6 was repeated, except that the polyethylene terephthalate film was heated to a temperature of about 150° C. while under tension. The coated film was laminated to polyvinylbutyral sheeting having a hydroxyl content of about 23%, a potassium-based adhesion control additive content of about 250 ppm, a thickness of about 30 mils, and plasticized with about 28% of tetraethyleneglycol di-n-heptanoate and further laminated to a sheet of 3/32-inch nominal thickness glass. The components were laminated at a pressure of 225 pounds per square inch and a temperature of about 135° C. for a period of 9 minutes to provide a unitary structure with excellent clarity.

In Comparative Example E, the procedure of Comparative Example C was repeated, except that the polyethylene terephthalate film was heated to a temperature of about 120° C. while under tension. The coated film was laminated to polyvinyl butyral sheeting having a hydroxyl content of about 23%, a potassium-based adhesion control additive content of about 250 ppm, a thickness of about 30 mils, and plasticized with about 28% of tetraethyleneglycol di-n-heptanoate and further laminated to a sheet of 3/32-inch nominal thickness glass. The components were laminated at a pressure of 225 pounds per square inch and a temperature of about 135° C. for a period of 9 minutes to provide a unitary structure with excellent clarity.

In Comparative Example F, the procedure of Comparative Example E was repeated, except that 298 parts of methyl trimethoxy silane was used instead of 342 parts, and the flame treated polyethylene terephthalate film was replaced with a polyethylene terephthalate film having a water-permeable colloid coating which is available from E. I. du Pont de Nemours and Company as Cronar® P-42. Also, the temperature of laminating was increased to about 149° C. and the time was increased to 90 minutes.

The laminates of Examples 9 and 10 and Comparative Examples E and F were compared for integrity or lack of crazing or cracking after exposure to environmental extremes. The laminates were compared as-made, after exposure to 53° C. and 100% relative humidity for 1 week and after exposure to −54° C. for 12 hours. The results are summarized in the following Table III.

TABLE III
CRAZE RESISTANCE OF THE COATED LAYER ON THE POLYETHYLENE TEREPHTHALATE FILM

| | | | CONDITON AFTER EXPOSURE TO: | |
|---|---|---|---|---|
| Example | Description | Room Temp. | −54° C. | 53° C. 100% R.H. |
| 9 | Azido-silane added; PET heat relaxed at 120° C.; Curing and laminating at 120° C. | Clear | Clear | Clear |
| 10 | Azido-silane added; PET heat relaxed at 150° C.; Curing and laminating at 150° C. | Clear | Clear | Clear |
| E | Epoxy-silane added; relaxed at 120° C.; Curing and laminating at 150° C. | Clear | Crazed | Clear |
| F | Epoxy-silane in coating; colloid pre-coated PET | Clear | — | Crazed |

EXAMPLE 11 AND COMPARATIVE EXAMPLES G AND H

In Example 11, the procedure of Comparative Example A was repeated, except that the film was coated on one side with the silanol solution and placed in an air circulating oven at about 100° C. for about 3 minutes. The uncoated side of the film was then laminated to polyvinyl butyral sheeting having a hydroxyl content of 23%, a potassium-based adhesion control additive content of about 250 ppm, a thickness of about 30 mils, and plasticized with about 28% of tetraethyleneglycol di-n-heptanoate and further laminated to a sheet of 3/32-inch nominal thickness glass. The films and glass were laminated at a pressure of 225 pounds per square inch and a temperature of about 135° C. for a period of 9 minutes to provide a unitary structure with excellent clarity.

In Comparative Examples G and H, the procedure of Example 11 was repeated, except that the coated film was omitted in Comparative Example G and was replaced by 3/32-inch nominal thickness glass in Comparative Example H.

The laminates of Example 11 and Comparative Examples G and H were compared for penetration resistance. The penetration resistance was determined by a changing height staircase method of dropping a 5-pound steel ball onto the 12-inch square laminates. The laminates of Example 11 were clamped in the support frame to insure failure by penetration and the laminates of Example 11 and Comparative Example G were conducted by the ball on the polymeric side of the glass. The results obtained are summarized in the following Table IV.

TABLE IV

PENETRATION RESISTANCE OF LAMINATES

| Example | Description | Mean Support Height (Feet) |
|---------|-------------|----------------------------|
| 11 | PET/PVB/GLASS Laminate | 31.7 |
| G | PVB/GLASS Laminate | 11.3 |
| H | GLASS/PVB/GLASS Laminate | 21.0 |

EXAMPLE 12 AND COMPARATIVE EXAMPLES I AND J

The procedure of Example 11 was repeated, except that the biaxially-stretched, flame treated, heat-relaxed polyethylene terephthalate film was replaced with an adhesion-promoting colloid-coated biaxially stretched film available from E. I. du Pont de Nemours and Company as Cronar® P-42 in Example 12; with an untreated, biaxially-stretched polyethylene terephthalate film in Comparative Example I; and with a biaxially-stretched polyethylene terephthalate film containing an inorganic slip additive, available from E. I. du Pont de Nemours and Company as Mylar® 300A, in Comparative Example J.

The laminates of Examples 11 and 12 and Comparative Examples I and J were compared for adhesion of the polyethylene terephthalate film to the polyvinyl butyral. The film adhesion was determined by a 180° peel adhesion test with the samples conditioned at 50% relative humidity and the sample grips moving at 20 inches per minute for a separation rate of 10 inches per minute (ASTM D 903-49 except for speed). The results obtained are summarized in the following Table V.

TABLE V

ADHESION OF POLYETHYLENE TEREPHTHALATE FILMS TO POLYVINYL BUTYRAL

| Example | Description | Peel Adhesion Pounds Per Inch |
|---------|-------------|-------------------------------|
| 11 | Flame-treated PET | 9.1 |
| 12 | Colloid-coated PET | 7.7 |
| I | Uncoated PET | 3.8 |
| J | PET containing slip additive | 0.04 |

I claim:

1. A process for preparing a polymeric laminate consisting essentially of:
    (a) coating at least one surface of a biaxially oriented, dimensionally stable, polyethylene terephthalate film having a thickness of about 2–7 mils and a haze level of less than about 1.0%, to provide a dry thickness of about 1–20 microns with an organic silanol coating composition consisting essentially of:
      (i) about 5–50 weight percent solids, the solids being partially polymerized and consisting essentially of 10–69 weight percent silica; 0.01–4 weight percent of azido functional silanol; and 30–89 weight percent of organic silanol of the general formula $RSi(OH)_3$, wherein R is selected from methyl and up to about 40% of a radical selected from vinyl and phenyl; and
      (ii) about 95–50 weight percent solvent, the solvent comprising about 10–90 weight percent water and about 90–10 weight percent lower aliphatic alcohol and containing about 0.01–1.0% non-ionic surfactant; the coating composition having a pH of about 6.2–6.5;
    (b) bonding the coated polyethylene terephthalate film at elevated heat and pressure to a sheet of plasticized polyvinyl butyral to provide a laminate in which the surface of the polyethylene terephthalate not bonded to the polyvinyl butyral is coated with the organic silanol composition.

2. A process of claim 1 wherein the azido functional silanol in the coating solution is obtained by adding to the aqueous components of the coating composition an azido functional silane of the general formula:

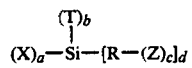

wherein R is an organic radical, X is selected from halo, hydroxy, alkoxy, aryloxy, organo oxycarbonyl, azido, amine, and amide radicals; T is selected from alkyl, cycloalkyl, aryl, alkaryl, and aralkyl radicals; a is an integer from 1 to 3; b is an integer from 0 to 2; c is an integer from 1 to 10; d is an integer from 1 to 3; and a+b+d equals 4; and Z is selected from

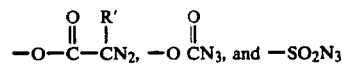

where R' is selected from hydrogen, alkyl, cycloalkyl, aryl and —COOR" radicals; where R" is selected from alkyl, cycloalkyl, and aryl radicals.

3. A process of claim 2 wherein R is an aryl radical of from 6–28 carbon atoms.

4. A process of claim 2 wherein X is alkoxy of 1 to 3 carbon atoms, and a is 1 to 3.

5. A process of claim 2 wherein Z is a sulfonyl azide of the formula —$SO_2N_3$.

6. A process of claim 2 wherein Z is an azido formate of the formula —$OCON_3$.

7. A process of claim 3 wherein the aryl radical is an alkylene diarylene radical.

8. A process of claim 1 wherein the non-ionic surfactant is a silicone surfactant.

9. A process of claim 1 wherein the polyvinyl butyral contains less than about 400 parts per million of potassium based adhesion control agent.

10. A process of claim 9 wherein the polyethylene terephthalate film is treated on at least one side to enhance the ability of the film to adhere to other materials.

11. A process of claim 10 wherein the polyethylene terephthalate film is treated with a reducing gas flame to enhance the ability of the film to adhere to other materials.

12. A process of claim 1 wherein one side of the polyethylene terephthalate film is coated with the coating composition and the polyvinyl butyral sheeting is bonded to the uncoated side of the polyethylene terephthalate film.

13. A process of claim 1 further comprising bonding at least one sheet of glass to the surface of the plasticized polyvinyl butyral.

14. A polymeric laminate consisting essentially of,
    (a) a sheet of plasticized polyvinyl butyral;
    (b) a biaxially oriented, dimensionally stable, polyethylene terephthalate film bonded to the polyvinyl butyral and having a thickness of about 2–7 mils and a haze level of less than about 1.0%, and,
    (c) a coating on the polyethylene terephthalate film having a thickness of about 1–20 microns, the coating having been produced from an organic silanol composition consisting essentially of:

(i) about 5-50 weight percent solids, the solids being partially polymerized and consisting essentially of 10-69 weight percent silica; 0.01-4 weight percent of azido functional silanol; and 30-89 weight percent of organic silanol of the general formula RSi(OH)$_3$, wherein R is selected from methyl and up to about 40% of a radical selected from vinyl and phenyl; and (ii) about 95-50 weight percent solvent, the solvent comprising about 10-90 weight percent water and about 90-10 weight percent lower aliphatic alcohol and containing about 0.01-1.0% non-ionic surfactant; the coating composition having a pH of about 6.2-6.5; and in which at least the surface of the polyethylene terephthalate not bonded to the polyvinyl butyral bears a coating (c).

15. A laminate of claim 14 wherein the azido functional silanol in the coating solution is obtained by adding to the aqueous components of the coating composition an azido functional silane of the general formula:

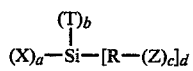

wherein R is an organic radical, X is selected from halo, hydroxy, alkoxy, aryloxy, organo oxycarbonyl, azido, amine, and amide radicals; T is selected from alkyl, cycloalkyl, aryl, alkaryl, and aralkyl radicals; a is an integer from 1 to 3; b is an integer from 0 to 2; c is an integer from 1 to 10; d is an integer from 1 to 3; and a+b+d equals 4; and Z is selected from

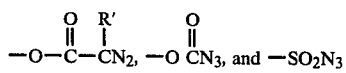

where R' is selected from hydrogen, alkyl, cycloalkyl, aryl and —COOR" radicals; where R" is selected from alkyl, cycloalkyl, and aryl radicals.

16. A laminate of claim 15 wherein R is an aryl radical of from 6-28 carbon atoms.

17. A laminate of claim 15 wherein X is alkoxy of 1 to 3 carbon atoms, and a is 1 to 3.

18. A laminate of claim 15 wherein Z is a sulfonyl azide of the formula —SO$_2$N$_3$.

19. A laminate of claim 14 wherein Z is an azido formate of the formula —OCON$_3$.

20. A laminate of claim 16 wherein the aryl radical is an alkylene diarylene radical.

21. A laminate of claim 14 wherein the non-ionic surfactant is a silicone surfactant.

22. A laminate of claim 14 wherein the polyvinyl butyral contains less than about 400 parts per million of potassium based adhesion control agent.

23. A laminate of claim 14 wherein the polyethylene terephthalate film has been treated on at least one side to enhance the ability of the film to adhere to other materials.

24. A laminate of claim 23 wherein the polyethylene terephthalate film has been treated on both sides with a reducing gas flame to enhance the ability of the film to adhere to other materials.

25. A laminate of claim 23 wherein the surface of the polyethylene terephthalate film bonded to the polyvinyl butyral has been treated with a water permeable colloid.

26. A laminate of claim 14 wherein one side of the polyethylene terephthalate film is coated with the coating composition and the polyvinyl butyral sheeting is bonded to the uncoated side of the polyethylene terephthalate film.

27. A laminate of claim 14 further comprising at least one sheet of glass bonded to the surface of the plasticized polyvinyl butyral.

* * * * *